(12) United States Patent
McCorkendale (10) Patent No.: US 7,716,739 B1
(45) Date of Patent: May 11, 2010

(54) SUBJECTIVE AND STATISTICAL EVENT TRACKING INCIDENT MANAGEMENT SYSTEM (75) Inventor: Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1138 days.

(21) Appl. No.: 11/186,133

(22) Filed: Jul. 20, 2005

(51) Int. Cl.
G08B 23/00 (2006.01)

(52) U.S. Cl. .......................................... 726/23; 726/25

(58) Field of Classification Search .................. 726/22, 726/23, 24, 25, 26; 340/5.8
See application file for complete search history.

(56) References Cited

U.S. PATENT DOCUMENTS

| 5,452,442 | A  | * | 9/1995 | Kephart | ....................... | 714/38 |
| 6,370,648 | B1 | * | 4/2002 | Diep | ............................ | 726/22 |
| 6,381,242 | B1 | * | 4/2002 | Maher et al. | ................. | 370/394 |
| 7,089,428 | B2 | * | 8/2006 | Farley et al. | .................. | 726/22 |
| 7,134,143 | B2 | * | 11/2006 | Stellenberg et al. | ........... | 726/25 |
| 7,463,590 | B2 | * | 12/2008 | Mualem et al. | ............. | 370/241 |
| 7,546,471 | B2 | * | 6/2009 | Phillips et al. | .............. | 713/188 |
| 2003/0162575 | A1 | * | 8/2003 | Morota et al. | ............... | 455/575 |
| 2005/0262576 | A1 | * | 11/2005 | Gassoway | .................... | 726/30 |
| 2006/0161984 | A1 | * | 7/2006 | Phillips et al. | ................ | 726/24 |

OTHER PUBLICATIONS

Lincoln, P. et al. "privacy-Preserving Sharing and Correlation of Security Alerts", pp. 1-16, published Aug. 2004. (submited IDS).*
Lincoln, P. et al, "Privacy-Preserving Sharing and Correlation of Security Alerts", pp. 1-16 [online]. Retrieved on Jul. 30, 2005. Retrieved from the Internet:<URL: http://scholar.google.com/url?sa=U&q=http://www.csl.sri.com/users/shmat/shmat_usenix04.ps>, publication date: Aug. 9-13, 2004.
"Markov Analysis", pp. 1-4 [online]. Retrieved on May 19, 2005. Retrieved from the Internet: <URL:http://encyclopedia.thefreedictionary.com/Markov+analysis>. No author provided, known to public at least on May 19, 2005 or before.

* cited by examiner

Primary Examiner—Eleni A Shiferaw
(74) Attorney, Agent, or Firm—Gunnison, McKay & Hodgson, L.L.P.; Serge J. Hodgson (57) ABSTRACT A method includes logging past event sequences in a knowledge base, receiving a real-time event sequence, comparing the real-time event sequence to the past event sequences to determine a predicted event sequence for the real-time event sequence, and providing the predicted event sequence, a suggested course of action with predicted outcome, and a recommendation of a user who previously encountered the event sequence. In the above manner, use of subjectively characterized and/or raw historic data to match real-time event sequences provides users with both subjective advice from those who had previously faced similar conditions as well as raw statistical predictions as to what is expected to come next. This allows the users to take a course of action that results in the most desirable outcome.

17 Claims, 7 Drawing Sheets

INCIDENT MANAGEMENT SYSTEM PREDICTION PROCESS 400

SUBJECTIVE AND STATISTICAL EVENT TRACKING INCIDENT MANAGEMENT SYSTEM

BACKGROUND OF THE INVENTION

1. Field of the Invention

The present invention relates to the protection of computer systems. More particularly, the present invention relates to an incident management system and method.

2. Description of the Related Art

Incident management systems are capable of detecting actual and suspected internal and external intrusions, e.g., stealth scans, and denial-of-service attacks. The actual and suspected internal and external intrusions and denial-of-service attacks are referred to as threats. The detection of a threat by an incident management system is referred to as an event. Generally, an event is an occurrence of some importance, e.g., has been identified as an occurrence that is to be monitored, and frequently one that has antecedent cause, e.g., is associated with malicious code.

Typically, the incident management system forwards the events to a central event manager. The central event manager may also receive events from other incident management systems. This provides an administrator of the central event manager information on all of the events on a network or a plurality of networks being monitored by the central event manager. However, administrators presented with a set of events will rarely find the requisite course of action is obvious.

SUMMARY OF THE INVENTION

In accordance with one embodiment, a method includes logging past event sequences in a knowledge base, receiving a real-time event sequence, comparing the real-time event sequence to the past event sequences to determine a predicted event sequence for the real-time event sequence, and providing the predicted event sequence.

In one embodiment, the method further includes logging past courses of action taken in response to the past event sequences and associated outcomes in the knowledge base, characterizing at least one of the associated outcomes as a positive outcome and providing the course of action associated with the positive outcome as a suggested course of action. Further, a recommendation of a user who previously encountered the event sequence is provided in one embodiment.

In the above manner, use of subjectively characterized and/or raw historic data to match real-time event sequences provides users of an incident management system in accordance with one embodiment of the present invention with both subjective advice from those who had previously faced similar conditions as well as raw statistical predictions as to what is expected to come next. This allows the users to take a course of action that results in the most desirable outcome.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
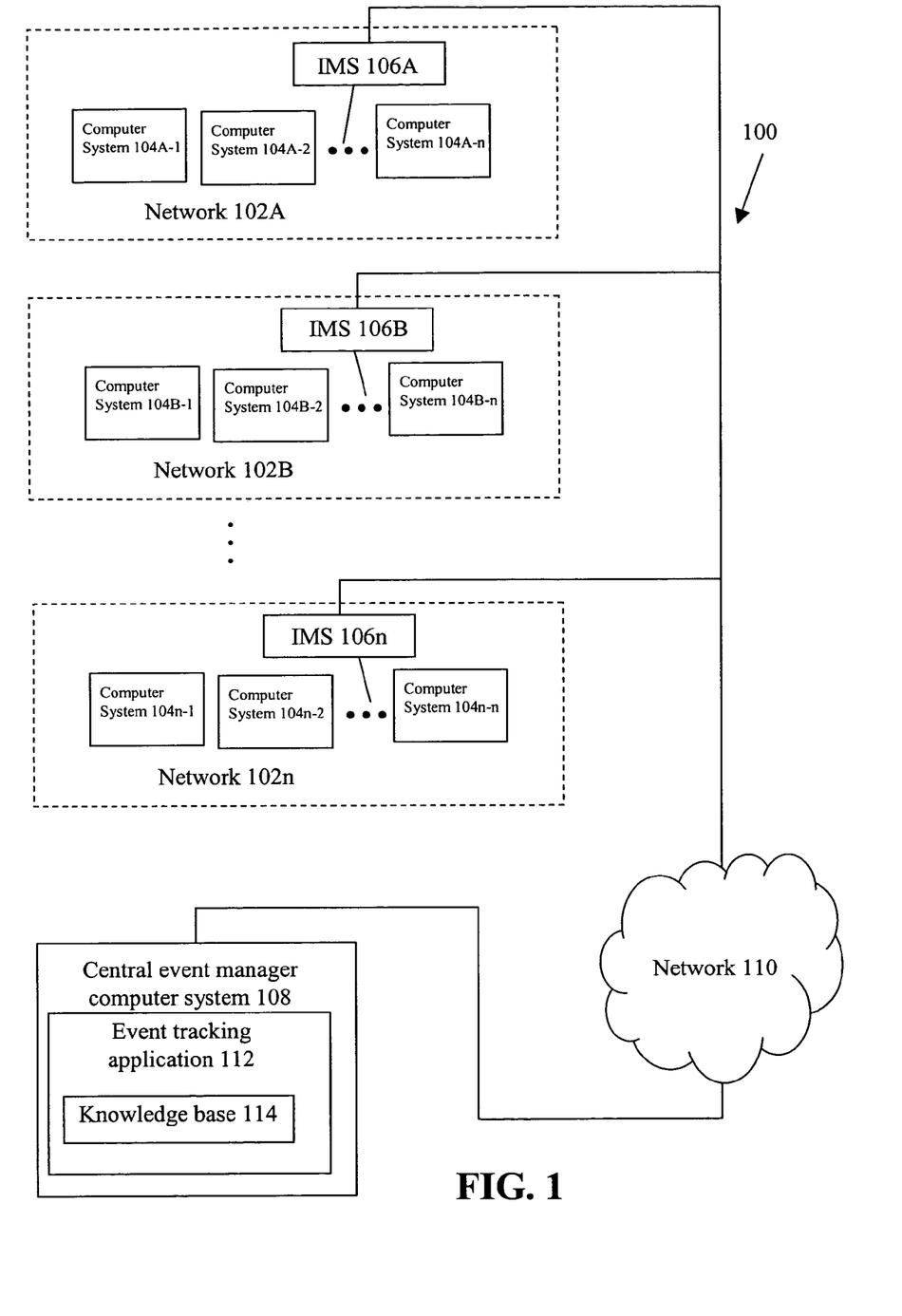
FIG. 1 is a diagram of a computer system that includes a plurality of networks in accordance with one embodiment of the present invention.

FIG. 1 is a diagram of a computer system 100 that includes a plurality of networks 102A, 102B, . . . , 102n, collectively networks 102, in accordance with one embodiment of the present invention. Referring to network 102A, network 102A includes a plurality of interconnected computer systems 104A-1, 104A-2, . . . , 104A-n, collectively computer systems 104A. Network 102A further includes an incident management system (IMS) 106A also coupled to computer systems 104A-1, 104A-2, . . . , 104A-n.

Similarly, networks 102B, . . . , 102n also include a plurality of interconnected computer systems 104B-1, 104B-2, . . . , 104B-n, . . . , 104n-1, 104n-2, . . . , 104n-n, respectively. Computer systems 104B-1, 104B-2, . . . , 104B-n, . . . , 104n-1, 104n-2, . . . , 104n-n, are collectively referred to as computer systems 104B, . . . , 104n, respectively.

Networks 102B, . . . , 102n further include incident management systems 106B, . . . , 106n also coupled to computer systems 104B, . . . , 104n, respectively.

Computer systems 104A, 104B, . . . , 104n and incident management systems 106A, 106B, . . . , 106n are collectively referred to as computer systems 104 and incident management systems 106, respectively. Illustratively, computer systems 104 and/or incident management systems 106 include security software such as firewall, antivirus, host and network intrusion detection software capable of gathering, consolidating and correlating events.

The particular type of and configuration of networks 102, computer systems 104 and incident management systems 106 are not essential to this embodiment of the present invention. Further, incident management systems such as incident management systems 106 and events are well known to those of skill in the art.

Networks 102, and, more particularly, incident management systems 106 are coupled to a central event manager computer system 108 by a network 110. Network 110 is any network or network system that is of interest to a user. An event tracking application 112 is executing on central event manager computer system 108.

Figure 2:
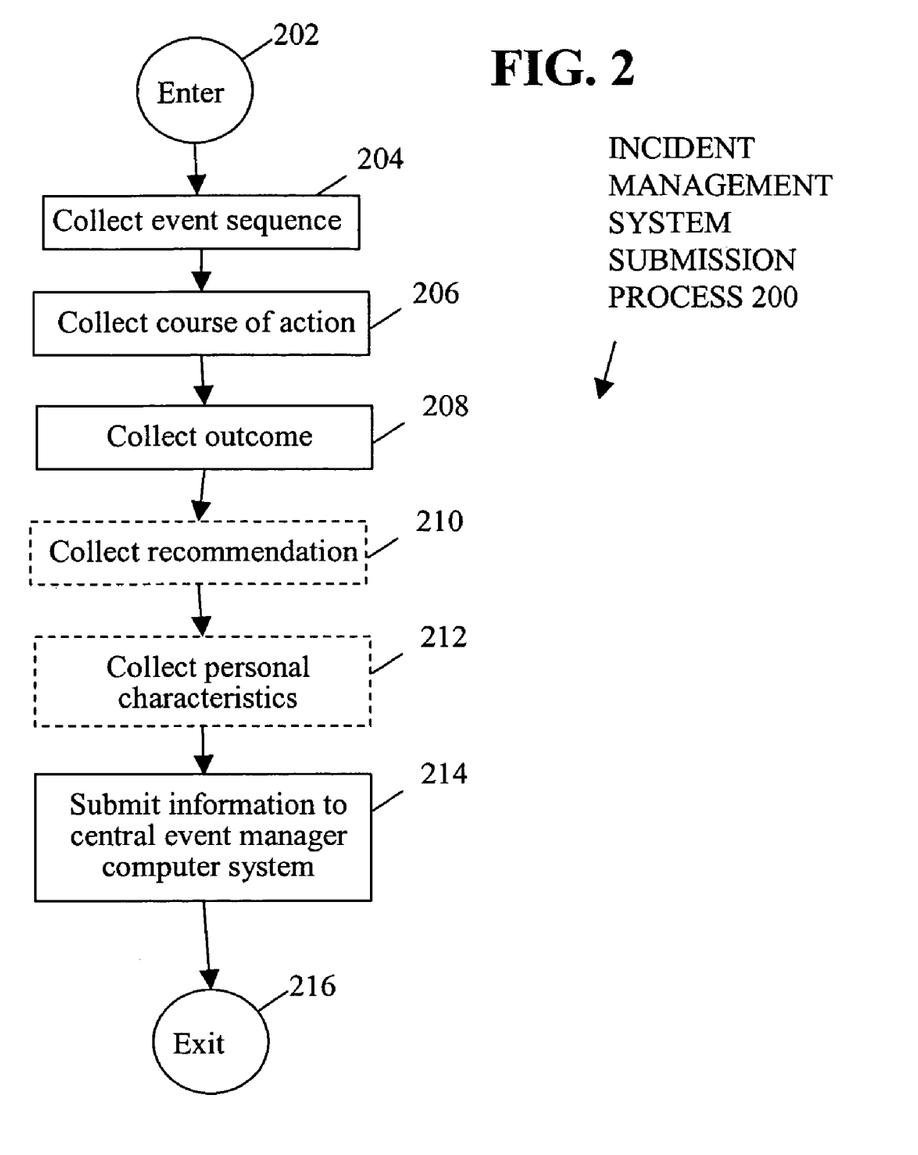
FIG. 2 is a flow diagram of an incident management system submission process in accordance with one embodiment of the present invention.

FIG. 2 is a flow diagram of an incident management system submission process 200 in accordance with one embodiment of the present invention. Execution of an event tracking application on an incident management system 106 results in the operations of incident management system submission process 200 as described below in one embodiment.

In accordance with one embodiment, a course of action was taken in response to the detection of an event sequence. This course of action led to an outcome, e.g., a positive outcome, a negative outcome or some other outcome. Incident management system submission process 200 is performed after the outcome. Thus, the event sequence, course of action and outcome are sometimes referred to herein as a past event sequence, a past course of action and a past outcome, respectively. However, in another embodiment, incident management system submission process 200 is performed in real-time, i.e., during the event sequence, while the course of action is taken, and/or during the outcome.

Referring now to FIGS. 1 and 2 together, from an ENTER OPERATION 202, flow moves to a COLLECT EVENT SEQUENCE OPERATION 204. In COLLECT EVENT SEQUENCE OPERATION 204, an event sequence is collected. In one embodiment, an event sequence is a sequence of events, e.g., a series of events that have occurred over a period of time. Generally, an event is an occurrence of some importance, e.g., has been identified as an occurrence that is to be monitored, and frequently one that has antecedent cause, e.g., is associated with malicious code. An event can be a summarization of several occurrences, e.g., an event is that a denial of service attack has occurred, and an event can be a single occurrence, e.g., a logon attempt.

The event sequence generally involves at least one computer system or systems. For example, the event sequence occurs on a network 102. Collection of an event sequence is well known to those of skill in the art and the particular technique used to collect the event sequence is not essential to this embodiment of the present invention. In one embodiment, an incident management system 106 collects an event sequence occurring on a network 102 and/or on a single computer system 104. It another embodiment, a computer system 104 collects an event sequence occurring on a network 102 and/or on a single computer system 104, e.g., on itself or another computer system 104.

Process flow moves from COLLECT EVENT SEQUENCE OPERATION 204 to a COLLECT COURSE OF ACTION OPERATION 206. In COLLECT COURSE OF ACTION OPERATION 206, a course of action is collected. The course of action is taken in response to the event sequence collected in COLLECT EVENT SEQUENCE OPERATION 204. The course of action is sometimes called the response to the event sequence.

Process flow moves from COLLECT COURSE OF ACTION OPERATION 206 to a COLLECT OUTCOME OPERATION 208. In COLLECT OUTCOME OPERATION 208, an outcome is collected. The outcome is the result of the course of action collected in COLLECT COURSE OF ACTION OPERATION 206. For example, a course of action X taken at a particular point in the event sequence led to an outcome Y.

In one embodiment, an outcome is a positive outcome, e.g., the threat which generated the event sequence is defeated or otherwise a desirable result is obtained. Alternatively, an outcome is a negative outcome, e.g., the threat which generated the event sequence is undefeated or other problems are created or otherwise an undesirable result is obtained. In yet another embodiment, an outcome is a neutral outcome, e.g., the threat is defeated but other problems are created or the result is otherwise marginal or indeterminate.

From COLLECT OUTCOME OPERATION 208, process flow moves, optionally, to a COLLECT RECOMMENDATION OPERATION 210. In COLLECT RECOMMENDATION OPERATION 210, a recommendation is collected. The recommendation, e.g., by the administrator of the network upon which the event sequence was detected, is related to the event sequence. For example, the recommendation is a different course of action that the administrator would have taken for the particular event sequence or a characterization of the outcome. Generally, after taking a course of action and observing the outcome, an administrator often learns what the administrator did right/wrong and provides this lesson as a recommendation. However, COLLECT RECOMMENDATION OPERATION 210 is optional and in one embodiment is not performed.

From COLLECT RECOMMENDATION OPERATION 210 (or directly from COLLECT OUTCOME OPERATION 208 in the event that COLLECT RECOMMENDATION OPERATION 210 is not performed), process flow moves, optionally, to COLLECT PERSONAL CHARACTERISTICS OPERATION 212. In COLLECT PERSONAL CHARACTERISTICS OPERATION 212, the personal characteristics of the computer system, computer systems, network, and/or organization associated with the event sequence is collected. In one embodiment, a personal characteristic is the industry segment to which the organization which took the course of action in response to the detected event sequence belongs.

For example, financial institutions of a particular size may encounter similar attacks (similar event sequences) and may take similar courses of action. Accordingly, in one embodiment, a personal characteristic is that the organization is a financial institution. Another personal characteristic is the size of the organization, e.g., financial institution.

However, COLLECT PERSONAL CHARACTERISTICS OPERATION 212 is optional and in one embodiment is not performed.

From COLLECT PERSONAL CHARACTERISTICS OPERATION 212 (or from OPERATIONS 208 or 210 depending upon which of optional OPERATIONS 210, 212 are performed), process flow moves to a SUBMIT INFORMATION TO CENTRAL EVENT MANAGER COMPUTER SYSTEM OPERATION 214. In SUBMIT INFORMATION TO CENTRAL EVENT MANAGER COMPUTER SYSTEM OPERATION 214, information is submitted to central event manager computer system 108. This information includes: (1) the event sequence collected in COLLECT EVENT SEQUENCE OPERATION 204; (2) the course of action collected in COLLECT COURSE OF ACTION OPERATION 206; and (3) the outcome collected in COLLECT OUTCOME OPERATION 208. Optionally, the information also includes the recommendation collected in COLLECT RECOMMENDATION OPERATION 210 and/or the personal characteristics collected in COLLECT PERSONAL CHARACTERISTICS OPERATION 212. From SUBMIT INFORMATION TO CENTRAL EVENT MANAGER COMPUTER SYSTEM OPERATION 214, process flow moves to and exits at an EXIT OPERATION 216.

Figure 3:
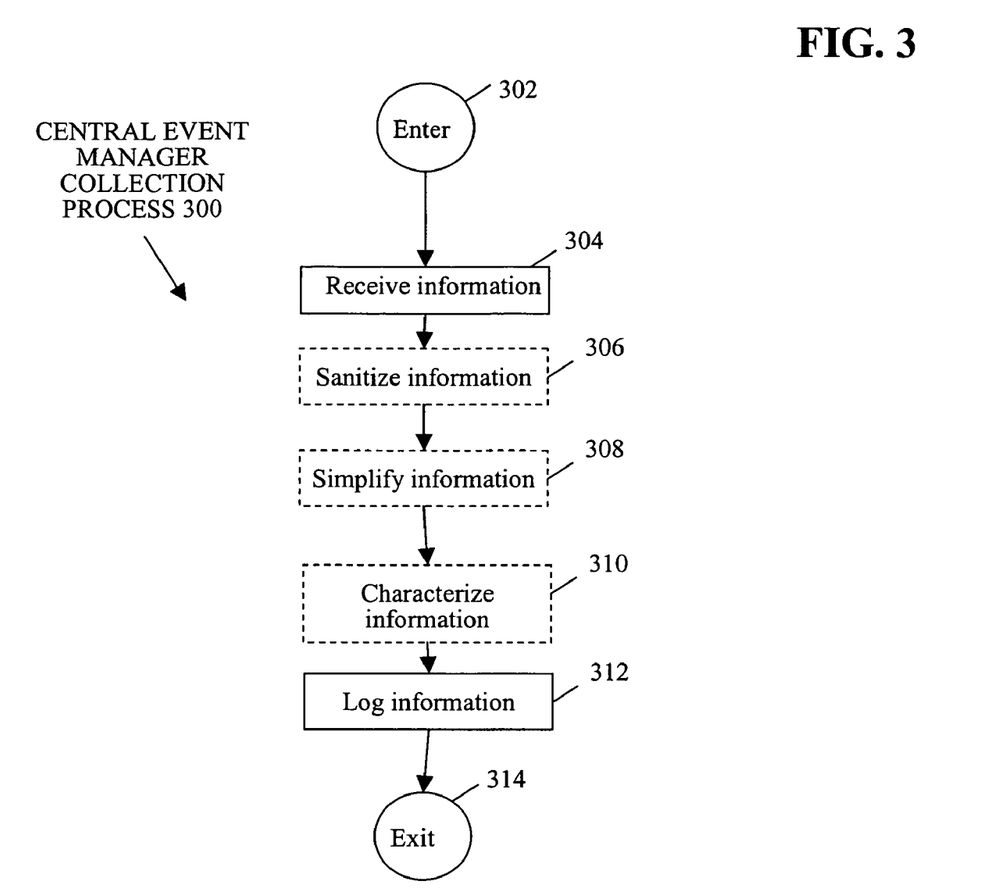
FIG. 3 is a flow diagram of a central event manager collection process in accordance with one embodiment of the present invention.

FIG. 3 is a flow diagram of a central event manager collection process 300 in accordance with one embodiment of the present invention. Referring now to FIGS. 1 and 3 together, execution of event tracking application 112 on central event manager computer system 108 results in the operations of central event manager collection process 300 as described below in one embodiment.

From an ENTER OPERATION 302, flow moves to a RECEIVE INFORMATION OPERATION 304. In RECEIVE INFORMATION OPERATION 304, central event manager computer system 108 receives information. As described above, this received information is submitted to central event manager computer system 108 during performance of SUBMIT INFORMATION TO CENTRAL EVENT MANAGER COMPUTER SYSTEM OPERATION 214. As discussed above, the received information includes: (1) an event sequence; (2) a course of action; and (3) an outcome. Optionally, the received information also includes a recommendation and/or personal characteristics.

From RECEIVE INFORMATION OPERATION 304, process flow moves, optionally, to a SANITIZE INFORMATION OPERATION 306. In SANITIZE INFORMATION OPERATION 306, the received information is sanitized, sometimes called data cleansed. In one embodiment, sensitive data such as the name or other confidential information of the organization submitting the information is cleansed from the received information. Generally, sensitive data is purged from the receive information and/or otherwise protected from improper disclosure.

Of course, if the received information does not contain any sensitive data and/or there are no restrictions on disclosure of the sensitive data, SANITIZE INFORMATION OPERATION 306 is unnecessary, and in one embodiment, is not performed.

From SANITIZE INFORMATION OPERATION 306 (or from RECEIVE INFORMATION OPERATION 304 if OPERATION 306 is not performed), process flow moves, optionally, to a SIMPLIFY INFORMATION OPERATION 308. In SIMPLIFY INFORMATION OPERATION 308, the received information is simplified. For example, unnecessary or redundant events are collapsed or deleted. As another example, particular actions of the course of action taken that are unique to the organization and not the event sequence are deleted. SIMPLIFY INFORMATION OPERATION 308 is optional, and in one embodiment, is not performed.

From SIMPLIFY INFORMATION OPERATION 308 (or from OPERATIONS 304 or 306 depending upon which of optional OPERATIONS 306, 308 are performed), process flow moves, optionally, to a CHARACTERIZE INFORMATION OPERATION 310. In CHARACTERIZE INFORMATION OPERATION 310, the received information is characterized. For example, the event sequence is characterized as a particular type of threat or a particular threat although other characterizations are possible. As another example, the outcome is characterized, e.g., as a positive, negative or neutral outcome. CHARACTERIZE INFORMATION OPERATION 310 is optional, and in one embodiment, is not performed.

From CHARACTERIZE INFORMATION OPERATION 310, (or from operation 304, 306, or 308 depending upon which of optional operations 306, 308, and 310 are performed), process flow moves to a LOG INFORMATION OPERATION 312. In LOG INFORMATION OPERATION 312, the received information is logged, e.g., stored or otherwise captured for later retrieval or use. In one embodiment, the received information is logged in a knowledge base 114 of central event manager computer system 108. The received information is logged as received, and/or as sanitized, simplified, and characterized depending upon which of operations 306, 308, and 310 are performed.

From LOG INFORMATION OPERATION 312, process flow exits at an EXIT OPERATION 314.

In the above process, central event manager computer system 108 receives information from a variety of different computer systems, networks, and/or organizations. The information is logged to knowledge base 114. Accordingly, knowledge base 114 is a collection of information documenting past sequences of events, past courses of actions, past outcomes of the past courses of actions, and recommendations. As set forth below, a computer system, computer systems, network, and/or organization detecting a real-time event sequence consults knowledge base 114 to determine a predicted event sequence for the detected real-time event sequence based on past event sequences, sometimes called historical records. Further, the knowledge base 114 is consulted to determine which course of action should be taken to obtain a desired outcome. Thus, upon detection of an attack, knowledge base 114 is consulted to defeat the attack in the most optimum or desired manner.

Figure 4:
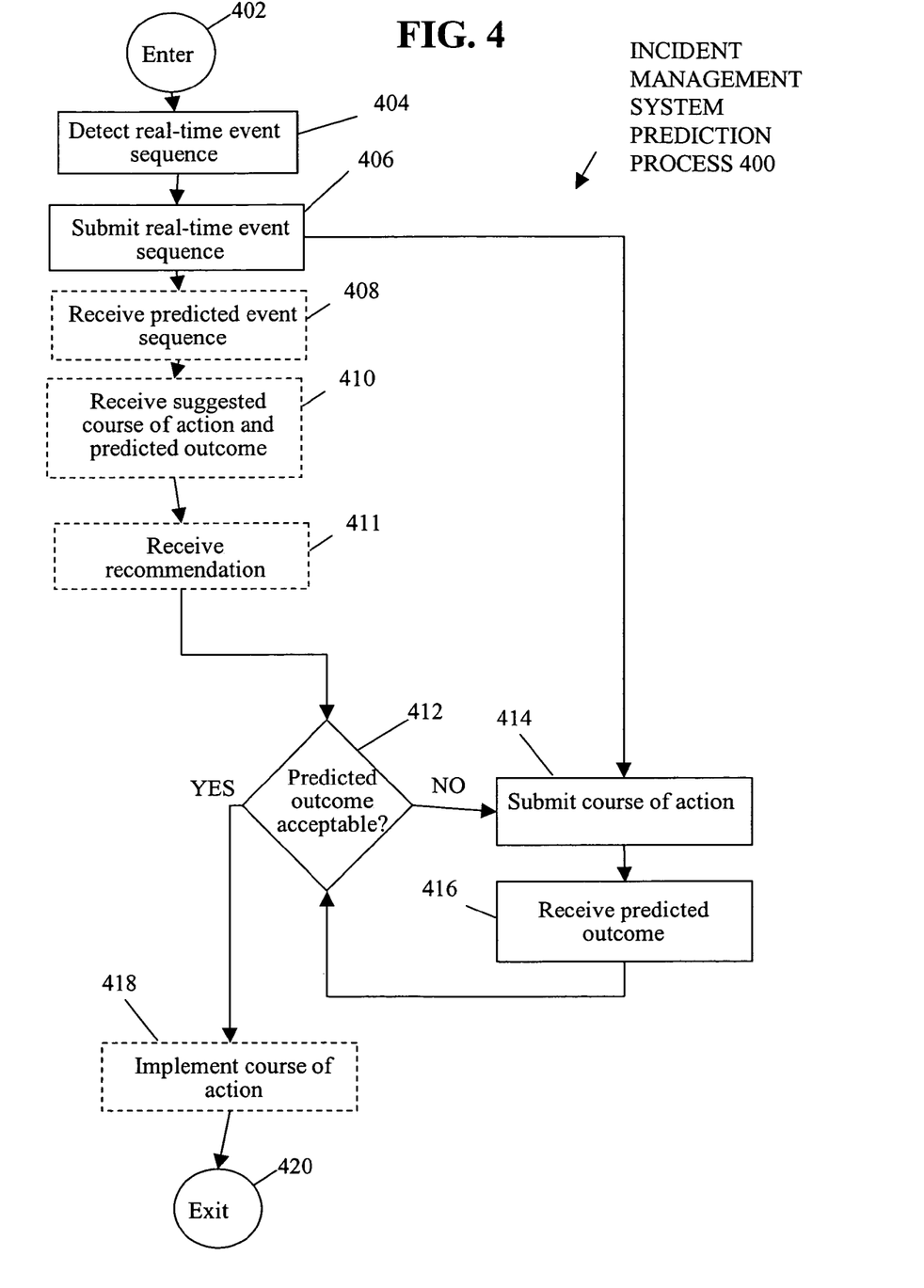
FIG. 4 is a flow diagram of an incident management system prediction process in accordance with one embodiment of the present invention.
Figure 5:
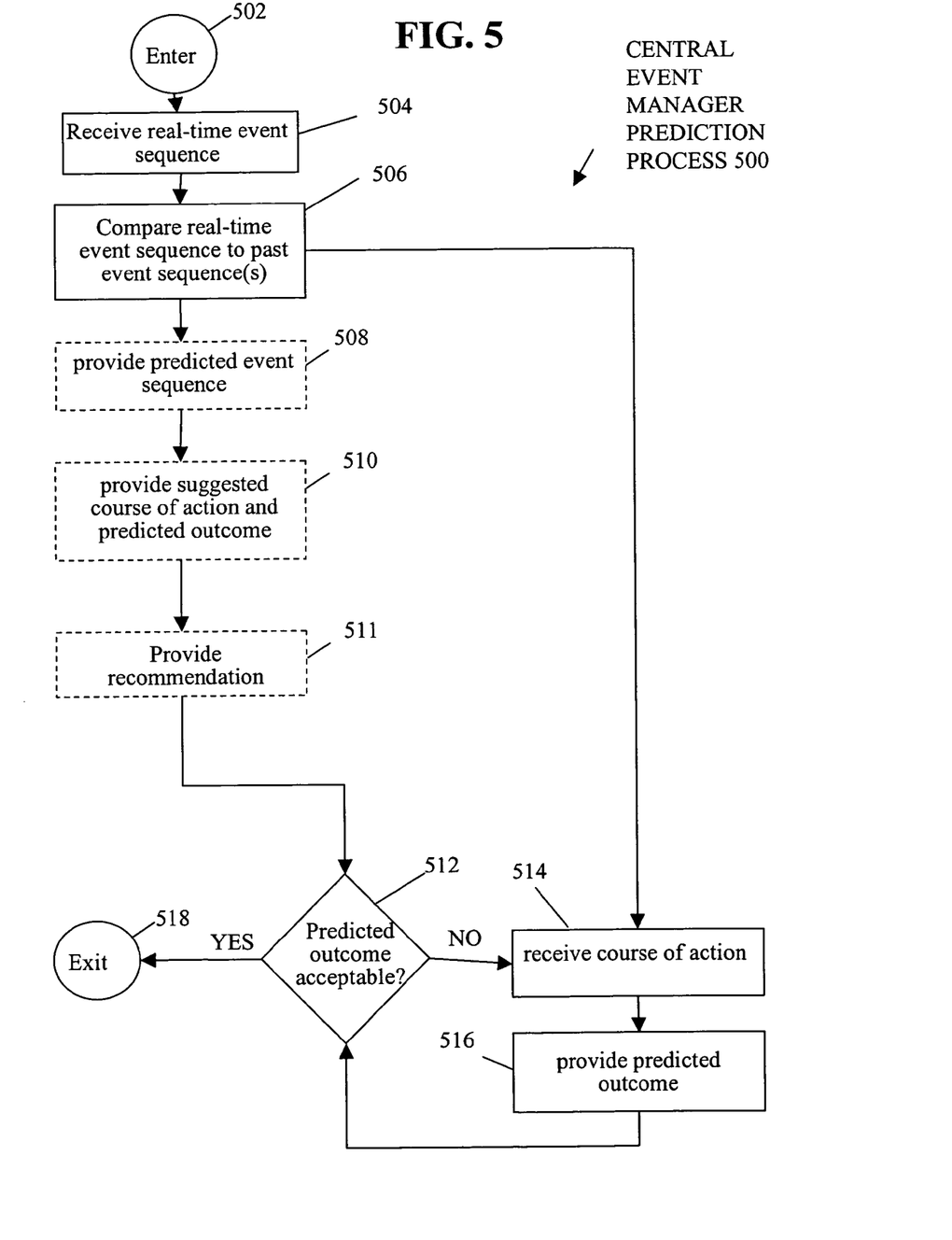
FIG. 5 is a flow diagram of a central event manager prediction process in accordance with one embodiment of the present invention.
Figure 6:
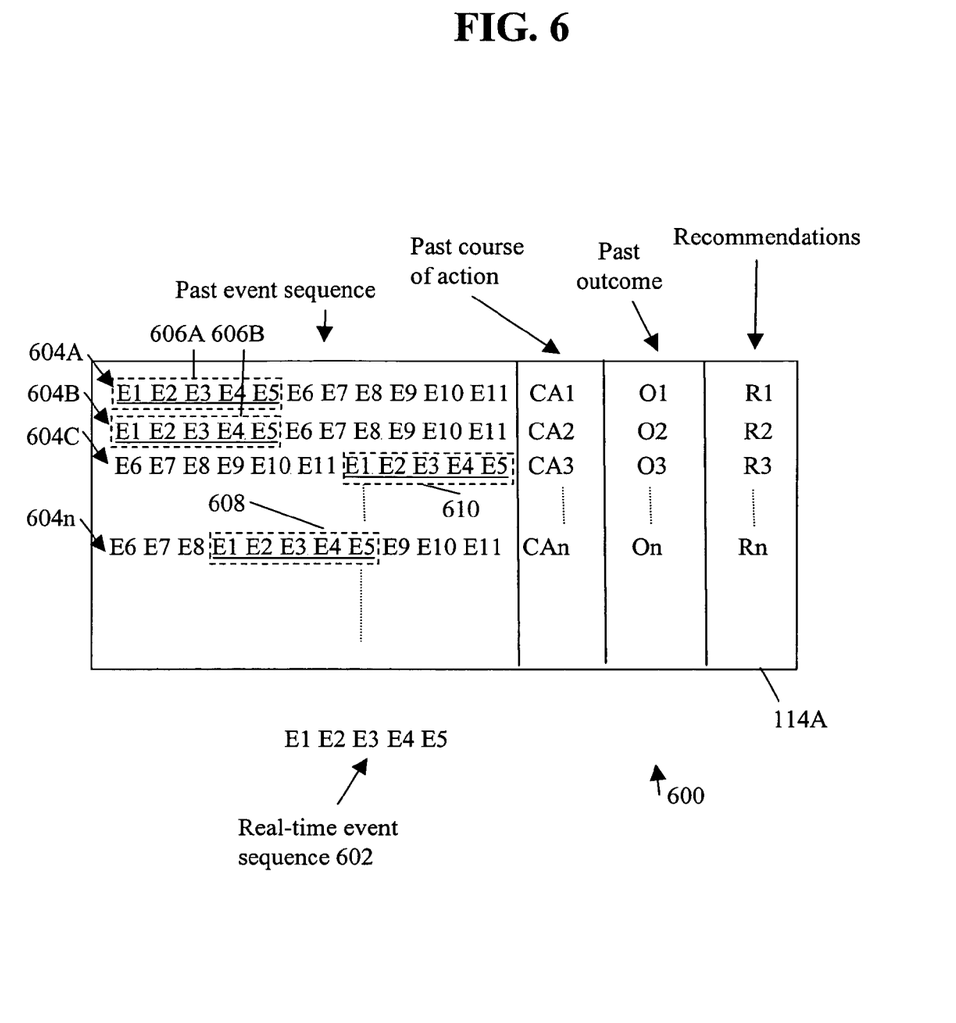
FIG. 6 is an exemplary diagram of a real-time event sequence and knowledge base in accordance with one embodiment of the present invention.

FIG. 4 is a flow diagram of an incident management system prediction process 400 in accordance with one embodiment of the present invention. FIG. 5 is a flow diagram of a central event manager prediction process 500 in accordance with one embodiment of the present invention. FIG. 6 is an exemplary diagram 600 of a real-time event sequence 602 and knowledge base 114A in accordance with one embodiment of the present invention. In one embodiment, incident management system prediction process 400 and central event manager prediction process 500 are complementary and are performed during the interactions between an incident management system and the central event manager computer system.

Referring now to FIGS. 4, 5 and 6 together, from an ENTER OPERATION 402, process flow moves to a DETECT REAL-TIME EVENT SEQUENCE OPERATION 404. In DETECT REAL-TIME EVENT SEQUENCE OPERATION 404, a real-time event sequence is detected. In accordance with one embodiment, a real-time event sequence, sometimes called a live event sequence or a current event sequence, is a sequence of events that are occurring in real-time, i.e., that are occurring at the present time. Detection of an event sequence is well-known to those of skill in the art and any one of a number of techniques can be used and the particular technique used is not essential to this embodiment of the present invention.

For purposes of illustration, a real-time event sequence 602 includes event E1, event E2, event E3, event E4, and event E5. Real-time event sequence 602 is detected during DETECT REAL-TIME EVENT SEQUENCE OPERATION 404.

From DETECT REAL-TIME EVENT SEQUENCE OPERATION 404, process flow moves to SUBMIT REAL-TIME EVENT SEQUENCE OPERATION 406. In SUBMIT REAL-TIME EVENT SEQUENCE OPERATION 406, the real-time event sequence is submitted to the central event manager computer system. In accordance with the illustration of FIG. 6, real-time event sequence 602 is submitted to the central event manager computer system.

Optionally, personal characteristics about the organization are also submitted during SUBMIT REAL-TIME EVENT SEQUENCE OPERATION 406. In accordance with this embodiment, the real-time event sequence is compared against past event sequences from similar organizations in a manner similar to that discussed below.

From an ENTER OPERATION 502, process flow moves to a RECEIVE REAL-TIME EVENT SEQUENCE OPERATION 504. In RECEIVE REAL-TIME EVENT SEQUENCE OPERATION 504, a real-time event sequence is received. Illustratively, the real-time event sequence is submitted in SUBMIT REAL-TIME EVENT SEQUENCE OPERATION 406 and received in RECEIVE REAL-TIME EVENT SEQUENCE OPERATION 504. Again, referring to the illustration of FIG. 6, real-time event sequence 602 is received during RECEIVE REAL-TIME EVENT SEQUENCE OPERATION 504.

From RECEIVE REAL-TIME EVENT SEQUENCE OPERATION 504, process flow moves to a COMPARE REAL-TIME EVENT SEQUENCE TO PAST EVENT SEQUENCE(S) OPERATION 506. In COMPARE REAL-TIME EVENT SEQUENCE TO PAST EVENT SEQUENCE(S) OPERATION 506, the real-time event sequence is compared to at least one past event sequence in the knowledge base and more typically to many or all of the past event sequences in the knowledge base. In accordance with one embodiment, a past event sequence is an event sequence which has been observed in the past. Illustratively, repeated performance of incident management system submission process 200 and central event manager collection process 300 logged the past event sequences in the knowledge base as discussed above.

In one embodiment, a real-time event sequence is a portion, sometimes called substream, of a longer event sequence. For example, a real-time event sequence is simply the beginning of a longer event sequence. Accordingly, the real-time event sequence is compared to the past event sequence(s) to determine if the real-time event sequence is a portion of a past event sequence. For example, a Markov analysis is used to match the real-time event sequence to a past event sequence or sequences. Markov analyses are well-known to those of skill in the art and so are not discussed in detail to avoid detracting from the principles of the invention. A match is an exact match between the real-time event sequence and the portion of the past event sequence. However, in another embodiment, a certain amount of difference, e.g., a specified number of different events, between the real-time event sequence and a portion of the past event sequence is allowed while still resulting in a match between the real-time event sequence and the portion of the past event sequence.

In another embodiment, a real-time event sequence is the entire sequence. In accordance with this embodiment, the real-time event sequence is compared to past event sequences to determine if the real-time event sequence matches a past event sequence or sequences. A match is an exact match between the real-time event sequence and a past event sequence. However, in another embodiment, a certain amount of difference, e.g., a specified number of different events, between the real-time event sequence and a past event sequence is allowed while still resulting in a match between the real-time event sequence and a past event sequence.

For example, referring to FIG. 6, knowledgebase 114A includes past event sequences 604A, 604B, 604C, . . . , 604n, associated past courses of action CA1, CA2, CA3, . . . , CAn, associated past outcomes O1, O2, O3, . . . , On, and, associated recommendations R1, R2, R3, . . . , Rn, respectively.

In one embodiment, the past outcomes O1, O2, O3, . . . , On are subjectively classified as positive outcomes, negative outcomes, or neutral outcomes. Illustratively, past outcomes O1, O2, O3, . . . , On are tagged or otherwise labeled to determine their classification.

The real-time event sequence 602 is compared to past event sequences 604A, 604B, 604C, . . . , 604n, collectively past event sequences 604.

As a result of this comparison, a determination is made that real-time event sequence 602 matches four past event sequences of knowledgebase 114A. More particularly, a determination is made that real-time event sequence 602 matches past event sequences 604A, 604B, 604C and 604n.

Specifically, the beginning portion 606A, sometimes called prefix, of past event sequence 604A includes events E1, E2, E3, E4, E5 which match events E1, E2, E3, E4, E5 of real-time event sequence 602. Similarly, the beginning portion 606B of past event sequence 604B includes events E1, E2, E3, E4, E5 which match events E1, E2, E3, E4, E5 of real-time event sequence 602. Past event sequences 604A and 604B are identical.

In accordance with one embodiment, a beginning portion of a past event sequence are the initial events, i.e., the first events, of the past event sequence. The beginning portion, i.e., the initial events, are followed by final events of the past event sequence.

A later portion 610 of past event sequence 604C includes events E1, E2, E3, E4, E5 which match events E1, E2, E3, E4, E5 of real-time event sequence 602. In accordance with one embodiment, a later portion of a past event sequence are the final events of the past event sequence, i.e., the events that end the past event sequence. For example, there are no events which follow events E1, E2, E3, E4, E5 of past event sequence 604C and thus events E1, E2, E3, E4, E5 are the final events of past event sequence 604C.

A later portion 608 of past event sequence 604n includes events E1, E2, E3, E4, E5 which match events E1, E2, E3, E4, E5 of real-time event sequence 602. In accordance with one embodiment, a later portion of a past event sequence are the later events, i.e., the events following the initial events, of the past event sequence. A later portion of a past event sequence is followed by final events of the past event sequence. For example, past event sequence 604n includes final events E9, E10, E11, which follow later portion 608 of past event sequence 604n.

From COMPARE REAL-TIME EVENT SEQUENCE TO PAST EVENT SEQUENCE(S) OPERATION 506, flow moves, optionally, to a PROVIDE PREDICTED EVENT SEQUENCE OPERATION 508. In PROVIDE PREDICTED EVENT SEQUENCE OPERATION 508, a predicted event sequence is provided. A predicted event sequence is the event sequence predicted to occur based on the real-time event sequence. Stated another way, for a real-time event sequence, a following set of events is expected to occur and this following set of events is the predicted event sequence.

In accordance with one embodiment, there are several predicted event sequences for a real-time event sequence. The predicted event sequence having the highest probability of occurring, e.g., that has occurred with the highest frequency in the past, is provided in PROVIDE PREDICTED EVENT SEQUENCE OPERATION 508.

For example, the real-time event sequence is the beginning or middle portion of a longer past event sequence. The events following the real-time event sequence of the past event sequence are the predicted event sequence. For example, if the real-time event sequence has been observed in 10,000 identical past event sequences and in one other different past event sequence, then the past event sequence which has been observed 10,000 times has a much greater probability of occurring than the past event sequence which has only occurred once.

To illustrate, as discussed above, real-time event sequence 602 is observed in past event sequence 604A, 604B, which are identical, i.e., two past event sequences. Real-time event sequence 602 is observed in past event sequence 604C, i.e., a single past event sequence, and in past event sequence 604n, another single past event sequence. Accordingly, all other things being equal, there is a greater probability, i.e., twice as great in this example, that past event sequence 604A is representative of the actual event sequence of which real-time event sequence 602 is a part than past event sequence 604C, 604n.

Thus, in accordance with this illustration, the predicted event sequence having the highest probability of occurring are events E6, E7, E8, E9, E10, E11 following beginning portion 606A of past event sequence 604A (and 604B). This predicted event sequence is provided in PROVIDE PREDICTED EVENT SEQUENCE OPERATION 508.

In accordance with another embodiment, all of the predicted event sequences are provided in PROVIDE PRE- DICTED EVENT SEQUENCE OPERATION 508. The predicted event sequences are ranked, e.g., from the predicted event sequence having the highest probability of occurring to the predicted event sequence having the lowest probability of occurring or by giving the probability percentage that the predicted event sequence will occur.

Thus, in accordance with this embodiment, the predicted event sequence having the highest probability of occurring are events E6, E7, E8, E9, E10, E11 following beginning portion 606A of past event sequence 604A. Other predicted event sequences having a lower probability of occurring are events E9, E10, and E11 following later portion 608 of past event sequence 604n and no further events following later portion 610 of past event sequence 604C. Accordingly, a predicted event sequence can be that there are no more events predicted to follow the real-time event sequence. These predicted event sequence are provided in PROVIDE PREDICTED EVENT SEQUENCE OPERATION 508.

In another embodiment, a confidence level for the predicted event sequence is calculated. A confidence level is the probability that the predicted event sequence will occur based on the real-time event sequence. A predicted event sequence is provided only if the confidence level exceeds a certain threshold.

From PROVIDE PREDICTED EVENT SEQUENCE OPERATION 508 (or directly from OPERATION 506 in the event that OPERATION 508 is not performed), flow moves, optionally, to a PROVIDE SUGGESTED COURSE OF ACTION AND PREDICTED OUTCOME OPERATION 510. In PROVIDE SUGGESTED COURSE OF ACTION AND PREDICTED OUTCOME OPERATION 510, a suggested course of action and a predicted outcome for the suggested course of action are provided.

For example, past outcome O1 associated with past event sequence 604A was more favorable than past outcome O2 associated with past event sequence 604B, e.g., past outcome O1 was a positive outcome and past outcome O2 was a negative outcome. Accordingly, past course of action CA1 and past outcome O1 associated with past event sequence 604A are provided as a suggested course of action and a predicted outcome in PROVIDE SUGGESTED COURSE OF ACTION AND PREDICTED OUTCOME OPERATION 510.

In another embodiment, a confidence level for the predicted outcome is calculated. In this embodiment, a confidence level is the probability that the predicted outcome will occur based on the suggested course of action. A suggested course of action is provided only if the confidence level exceeds a certain threshold.

From PROVIDE SUGGESTED COURSE OF ACTION AND PREDICTED OUTCOME OPERATION 510 (or directly from OPERATIONS 506 or 508 depending upon which of optional OPERATIONS 508, 510 are performed), flow moves, optionally, to a PROVIDE RECOMMENDATION OPERATION 511. In PROVIDE RECOMMENDATION OPERATION 511, a recommendation is provided. For example, recommendation R1 associated with past event sequence 604A is provided in PROVIDE RECOMMENDATION OPERATION 511.

Paying particular attention now to FIG. 4, from SUBMIT REAL-TIME EVENT SEQUENCE OPERATION 406, flow moves, optionally, to a RECEIVE PREDICTED EVENT SEQUENCE OPERATION 408. In RECEIVE PREDICTED EVENT SEQUENCE OPERATION 408, a predicted event sequence is received. For example, the received predicted event sequence is provided in PROVIDE PREDICTED EVENT SEQUENCE OPERATION 508.

From RECEIVE PREDICTED EVENT SEQUENCE OPERATION 408 (or directly from SUBMIT REAL-TIME EVENT SEQUENCE OPERATION 406 in the event that OPERATION 408 is not performed), flow moves, optionally, to a RECEIVE SUGGESTED COURSE OF ACTION AND PREDICTED OUTCOME OPERATION 410. In RECEIVE SUGGESTED COURSE OF ACTION AND PREDICTED OUTCOME OPERATION 410, a suggested course of action and a predicted outcome for the suggested course of action are received. For example, the predicted outcome for the suggested course of action are provided in PROVIDE SUGGESTED COURSE OF ACTION AND PREDICTED OUTCOME OPERATION 510.

From RECEIVE SUGGESTED COURSE OF ACTION AND PREDICTED OUTCOME OPERATION 410 (or directly from OPERATIONS 406 or 408 depending upon which of optional OPERATIONS 408, 410 are performed), flow moves, optionally, to a RECEIVE RECOMMENDATION OPERATION 411. In RECEIVE RECOMMENDATION OPERATION 411, a recommendation is received. For example, the recommendation is provided in PROVIDE RECOMMENDATION OPERATION 511.

In one embodiment, operations 406, 408, 410, 411 occur in real-time. For example, upon viewing of the real-time event sequence in detect real-time event sequence operation 404, operations 406, 408, 410, and 411 occur in real-time without prompting from the user such that operations 406, 408, 410, and 411 are transparent to the user.

From RECEIVE RECOMMENDATION OPERATION 411 (or directly from operation 406, 408, or 410 depending on which of operations 408, 410, 411 are performed), flow moves to a PREDICTED OUTCOME ACCEPTABLE CHECK OPERATION 412. In PREDICTED OUTCOME ACCEPTABLE CHECK OPERATION 412, a determination is made as to whether the predicted outcome is acceptable. If a determination is made that the predicted outcome is acceptable, flow moves, optionally, to an IMPLEMENT COURSE OF ACTION OPERATION 418 or directly to an EXIT OPERATION 420 if operation 418 is not performed. Conversely, if a determination is made that the predicted outcome is unacceptable, flow moves to a SUBMIT COURSE OF ACTION OPERATION 414.

For example, the administrator, sometimes called a user, requires a different outcome than the predicted outcome received in RECEIVE SUGGESTED COURSE OF ACTION AND PREDICTED OUTCOME OPERATION 410. Thus, in accordance with this embodiment of the present invention, the administrator can submit a variety of different courses of action until a desired predicted outcome is received. In this manner, the administrator can customize the course of action to receive a desired outcome.

More particularly, if a determination is made in PREDICTED OUTCOME ACCEPTABLE CHECK OPERATION 412 that the predicted outcome is unacceptable, flow moves to SUBMIT COURSE OF ACTION OPERATION 414. In SUBMIT COURSE OF ACTION OPERATION 414, a course of action, sometimes called a proposed course of action, is submitted to the central event manager computer system.

From SUBMIT COURSE OF ACTION OPERATION 414, flow moves to a RECEIVE PREDICTED OUTCOME OPERATION 416. In RECEIVE PREDICTED OUTCOME OPERATION 416, a predicted outcome for the course of action is received. Optionally, the recommendation associated the predicted outcome is also received.

From RECEIVE PREDICTED OUTCOME OPERATION 416, flow returns to PREDICTED OUTCOME ACCEPT- ABLE CHECK OPERATION 412. In PREDICTED OUTCOME ACCEPTABLE CHECK OPERATION 412, a determination is made as to whether the predicted outcome received in RECEIVE PREDICTED OUTCOME OPERATION 416 is acceptable. If the predicted outcome is unacceptable, operations 414 and 416 are repeated. Alternatively, if the predicted outcome is acceptable, flow moves, optionally, to an IMPLEMENT COURSE OF ACTION OPERATION 418.

In IMPLEMENT COURSE OF ACTION OPERATION 418, the course of action which led to the acceptable predicted outcome is implemented. The course of action can be implemented in any one of a number of ways and the particular technique used to implement the course of action is not essential to this embodiment of the present invention. From IMPLEMENT COURSE OF ACTION OPERATION 418 (or directly from PREDICTED OUTCOME ACCEPTABLE CHECK OPERATION 412 in the event that operation 418 is not performed), flow exits at EXIT OPERATION 420.

In accordance with another embodiment, a predicted outcome is not received prior to PREDICTED OUTCOME ACCEPTABLE CHECK OPERATION 412. For example, RECEIVE SUGGESTED COURSE OF ACTION AND PREDICTED OUTCOME OPERATION 410 is not performed. Accordingly, in PREDICTED OUTCOME ACCEPTABLE CHECK OPERATION 412, a determination is made, e.g., by an administrator, whether the predicted outcome and more specifically the lack of a predicted outcome is acceptable.

In accordance with another embodiment, an administrator desires to try a course of action and see the predicted outcome. In accordance with this embodiment, process flow moves directly from SUBMIT REAL-TIME EVENT SEQUENCE OPERATION 406 to SUBMIT COURSE OF ACTION OPERATION 414. Otherwise, process flow within incident management system prediction process 400 remains as discussed above.

Paying particular attention now to FIG. 5, from PROVIDE RECOMMENDATION OPERATION 511 (or directly from OPERATION 506, 508, or 510 depending on which of optional OPERATIONS 508, 510, 511 are performed), flow moves to a PREDICTED OUTCOME ACCEPTABLE CHECK OPERATION 512. In PREDICTED OUTCOME ACCEPTABLE CHECK OPERATION 512, a determination is made as to whether the predicted outcome is acceptable. If a determination is made that the predicted outcome is acceptable, flow moves to and exits at an EXIT OPERATION 518. Conversely, if a determination is made that the predicted outcome is unacceptable, flow moves to a RECEIVE COURSE OF ACTION OPERATION 514.

For example, a different outcome than the predicted outcome provided in PROVIDE SUGGESTED COURSE OF ACTION AND PREDICTED OUTCOME OPERATION 510 is required.

More particularly, if a determination is made in PREDICTED OUTCOME ACCEPTABLE CHECK OPERATION 512 that the predicted outcome is unacceptable, or directly from operation 506, flow moves to RECEIVE COURSE OF ACTION OPERATION 514. In RECEIVE COURSE OF ACTION OPERATION 514, a course of action is received by the central event manager computer system.

From RECEIVE COURSE OF ACTION OPERATION 514, flow moves to a PROVIDE PREDICTED OUTCOME OPERATION 516. In PROVIDE PREDICTED OUTCOME OPERATION 516, a predicted outcome for the course of action is provided. Optionally, a recommendation associated with the predicted outcome is also provided.

To illustrate, assume a course of action is received in RECEIVE COURSE OF ACTION OPERATION 514. This received course of action matches past course of action CA2 associated with past event sequence 604B. Past course of action CA2 is sometimes called another past course of action. Accordingly, the associated predicted outcome is past outcome O2. Thus, past outcome O2 is provided in PROVIDE PREDICTED OUTCOME OPERATION 516.

From PROVIDE PREDICTED OUTCOME OPERATION 516, flow returns to PREDICTED OUTCOME ACCEPTABLE CHECK OPERATION 512. In PREDICTED OUTCOME ACCEPTABLE CHECK OPERATION 512, a determination is made as to whether the predicted outcome provided in PROVIDE PREDICTED OUTCOME OPERATION 516 is acceptable. If the predicted outcome is unacceptable, operations 514 and 516 are repeated. Alternatively, if the predicted outcome is acceptable, flow exit at EXIT OPERATION 518.

In the above manner, use of subjectively characterized and/or raw historic data to match real-time event sequences provides users of an incident management system in accordance with one embodiment of the present invention with both subjective advice from those who had previously faced similar conditions as well as raw statistical predictions as to what is expected to come next. This allows the users to take a course of action that results in the most desirable outcome.

Although various actions by a user are described above, in one embodiment, trend analysis and machine learning techniques are used. For example, a Bayesian analysis, support vector machines and/or neural network is used.

Figure 7:
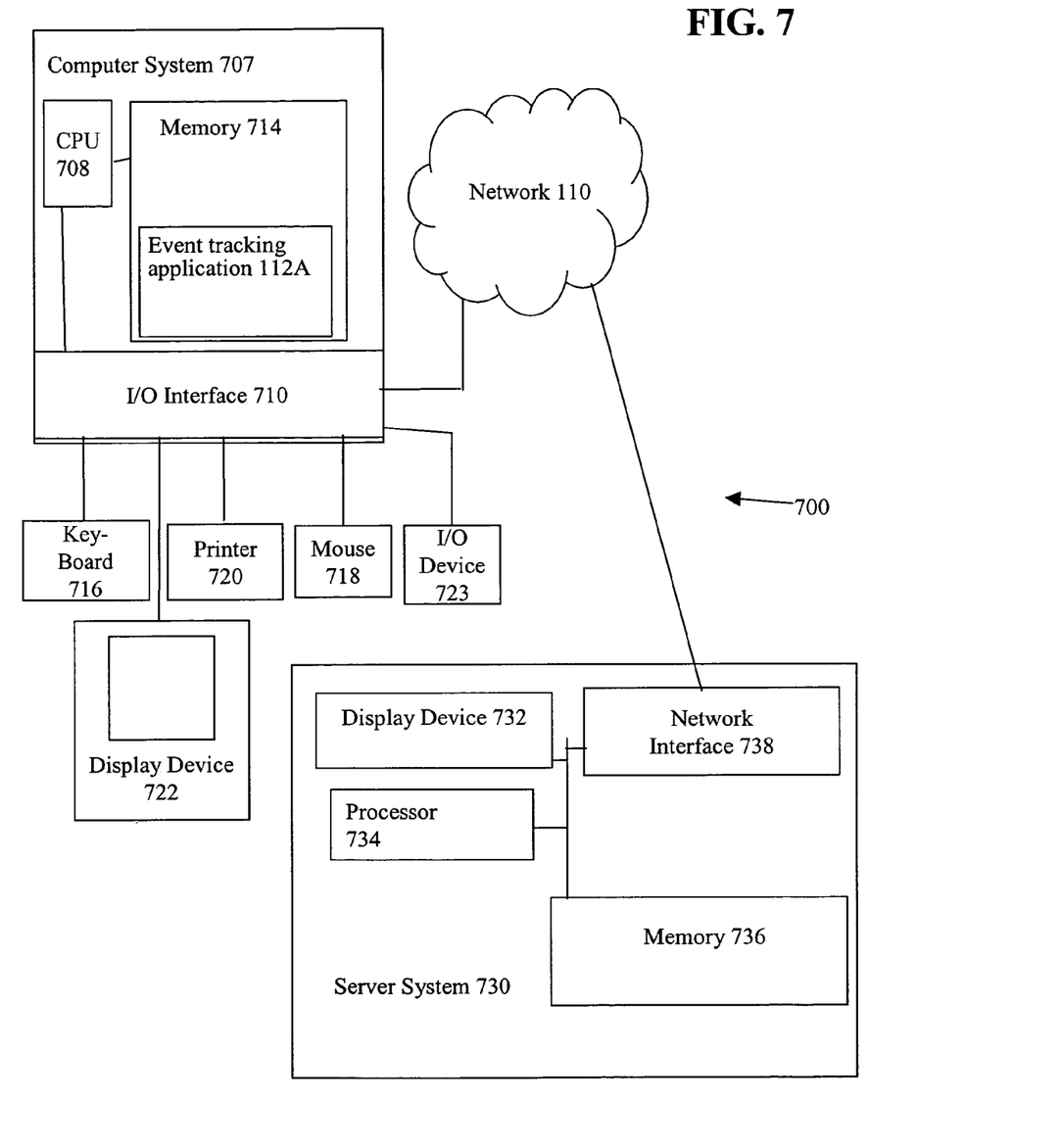
FIG. 7 is a diagram of a client-server system that includes an event tracking application executing on a computer system in accordance with one embodiment of the present invention.

FIG. 7 is a diagram of a client-server system 700 that includes an event tracking application 112A executing on a computer system 707, e.g., a first computer system, in accordance with one embodiment of the present invention. Referring now to FIGS. 1 and 7 together, computer system 707 is representative of computer system 108 of FIG. 1, an incident management system 106, and a computer system 104 in one embodiment. Further, client-server system 700 is part of computer system 100 in one embodiment.

Computer system 707, sometimes called a client or user device, typically includes a central processing unit (CPU) 708, hereinafter processor 708, an input output (I/O) interface 710, and a memory 714. Computer system 707 may further include standard devices like a keyboard 716, a mouse 718, a printer 720, and a display device 722, as well as, one or more standard input/output (I/O) devices 723, such as a compact disk (CD) or DVD drive, floppy disk drive, or other digital or waveform port for inputting data to and outputting data from computer system 707. In one embodiment, event tracking application 112A is loaded into computer system 707 via I/O device 723, such as from a CD, DVD or floppy disk containing event tracking application 112A.

Computer system 707 is coupled to a server system 730 of client-server system 700 by network 110. Server system 730 typically includes a display device 732, a processor 734, a memory 736, and a network interface 738.

Network 110 can be any network or network system that is of interest to a user. In various embodiments, network interface 738 and I/O interface 710 include analog modems, digital modems, or a network interface card.

Event tracking application 112A is stored in memory 714 of computer system 707 and executed on computer system 707. The particular type of and configuration of computer system 707 and server system 730 are not essential to this embodiment of the present invention.

Event tracking application 112A is in computer memory 714. As used herein, a computer memory refers to a volatile memory, a non-volatile memory, or a combination of the two.

Although event tracking application 112A is referred to an application, this is illustrative only. Event tracking application 112A should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network.

As illustrated in FIG. 7, this medium may belong to the computer system itself. However, the medium also may be removed from the computer system. For example, event tracking application 112A may be stored in memory 736 that is physically located in a location different from processor 708. Processor 708 should be coupled to the memory 736. This could be accomplished in a client-server system, or alternatively via a connection to another computer via modems and analog lines, digital interfaces and a digital carrier line, or wireless or cellular connections.

More specifically, in one embodiment, computer system 707 and/or server system 730 is a portable computer, a workstation, a two-way pager, a cellular telephone, a smart phone, a digital wireless telephone, a personal digital assistant, a server computer, an Internet appliance, or any other device that includes components that can execute the event tracking functionality in accordance with at least one of the embodiments as described herein. Similarly, in another embodiment, computer system 707 and/or server system 730 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the event tracking functionality in accordance with one embodiment of the present invention can be implemented in a wide variety of computer system configurations. In addition, the event tracking functionality could be stored as different modules in memories of different devices. For example, event tracking application 112A could initially be stored in server system 730, and then as necessary, a portion of event tracking application 112A could be transferred to computer system 707 and executed on computer system 707. Consequently, part of the event tracking functionality would be executed on processor 734 of server system 730, and another part would be executed on processor 708 of computer system 707. In view of this disclosure, those of skill in the art can implement various embodiments of the present invention in a wide-variety of physical hardware configurations using an operating system and computer programming language of interest to the user.

In yet another embodiment, event tracking application 112A is stored in memory 736 of server system 730. Event tracking application 112A is transferred over network 110 to memory 714 in computer system 707. In this embodiment, network interface 738 and I/O interface 710 would include analog modems, digital modems, or a network interface card. If modems are used, network 110 includes a communications network, and event tracking application 112A is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   receiving a real-time event sequence;
   comparing, by a processor, said real-time event sequence to at least one past event sequence in a knowledge base stored in a memory, said real-time event sequence being a portion of said past event sequence;
   providing a predicted event sequence comprising events of said past event sequence following said portion, said predicted event sequence is a new event sequence predicted to occur after said real-time event sequence;
   wherein said knowledge base further comprises a past course of action taken in response to said past event sequence, said method further comprising providing said past course of action as a suggested course of action to take in response to said real-time event sequence; and
   wherein said knowledge base further comprises a past outcome that resulted from taking said past course of action, said method further comprising providing said past outcome as a predicted outcome to taking said suggested course of action.

2. The method of claim 1 wherein said past event sequence is an event sequence which has been observed in the past.

3. The method of claim 2 further comprising:
   collecting said past event sequence; and
   logging said past event sequence in said knowledge base.

4. The method of claim 2 further comprising:
   collecting said past course of action taken in response to said past event sequence;
   collecting said past outcome of said past course of action; and
   associating said past course of action and said past outcome to said past event sequence in said knowledge base.

5. The method of claim 4 further comprising characterizing said past outcome.

6. The method of claim 1 wherein said portion of said past event sequence comprises a beginning portion of said past event sequence.

7. The method of claim 6 wherein said beginning portion comprises initial events of said past event sequence.

8. The method of claim 7 wherein said predicted event sequence comprises final events of said past event sequence, said final events following said initial events.

9. The method of claim 1 wherein said portion of said past event sequence comprises a later portion of said past event sequence.

10. The method of claim 9 wherein said later portion comprises later events following initial events of said past event sequence.

11. The method of claim 9 wherein said predicted event sequence comprises final events of said past event sequence, said final events following said later events.

12. The method of claim 1 further comprising determining whether said predicted outcome is acceptable.

13. The method of claim 12 wherein upon a determination that said predicted outcome is unacceptable, said method further comprising receiving a proposed course of action.

14. The method of claim 13 wherein said knowledge base further comprises another past course of action matching said proposed course of action, wherein said knowledge base further comprises another past outcome associated with said another past course of action, said method further comprising providing said another past outcome as a predicted outcome to said proposed course of action.

15. The method of claim 1 wherein said knowledge base further comprises a recommendation associated with said past event sequence, said method further comprising providing said recommendation.

16. A method comprising:
   logging past event sequences in a knowledge base stored in a memory;
   logging past courses of action taken in response to said past event sequences and associated outcomes in said knowledge base;
   characterizing at least one of said associated outcomes as a positive outcome;
receiving a real-time event sequence;
   comparing, by a processor, said real-time event sequence to said past event sequences to determine a predicted event sequence for said real-time event sequence;
   providing said predicted event sequence, said predicted event sequence is a new event sequence predicted to occur after said real-time event sequence;
   providing one of said courses of action associated with said positive outcome as a suggested course of action to take in response to said real-time event sequence; and
   providing said positive outcome as a predicted outcome to taking said suggested course of action.

17. A computer system comprising:
   a memory having stored therein an event tracking application; and
   a processor coupled to said memory, wherein execution of said event tracking application generates a method comprising:
   comparing a real-time event sequence to at least one past event sequence in a knowledge base, said real-time event sequence being a portion of said past event sequence;
   determining a predicted event sequence comprising events of said past event sequence following said portion, said predicted event sequence is a new event sequence predicted to occur after said real-time event sequence;
   wherein said knowledge base further comprises a past course of action taken in response to said past event sequence, said method further comprising providing said past course of action as a suggested course of action to take in response to said real-time event sequence; and
   wherein said knowledge base further comprises a past outcome that resulted from taking said past course of action, said method further comprising providing said past outcome as a predicted outcome to taking said suggested course of action.

* * * * *